United States Patent
Saruta et al.

(10) Patent No.: US 9,489,593 B2
(45) Date of Patent: Nov. 8, 2016

(54) INFORMATION PROCESSING APPARATUS AND TRAINING METHOD

(71) Applicant: CANON KABUSHIKI KAISHA, Tokyo (JP)

(72) Inventors: Takayuki Saruta, Tokyo (JP); Yusuke Mitarai, Tokyo (JP); Hiroto Yoshii, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 14/218,074

(22) Filed: Mar. 18, 2014

(65) Prior Publication Data

US 2014/0286568 A1  Sep. 25, 2014

(30) Foreign Application Priority Data

Mar. 21, 2013 (JP) .................. 2013-058567

(51) Int. Cl.
*G06K 9/00* (2006.01)
*G06K 9/62* (2006.01)

(52) U.S. Cl.
CPC ..... *G06K 9/6211* (2013.01); *G06K 2009/6213* (2013.01)

(58) Field of Classification Search
None
See application file for complete search history.

(56) References Cited

U.S. PATENT DOCUMENTS

| | | | | |
|---|---|---|---|---|
| 9,075,026 B2* | 7/2015 | Urano | ................ | G01N 21/9501 |
| 2006/0215902 A1* | 9/2006 | Shibuya | ........... | G01N 21/95607 382/149 |
| 2007/0177787 A1* | 8/2007 | Maeda | .................... | G06T 7/001 382/141 |
| 2010/0172555 A1* | 7/2010 | Hasezawa | .......... | G06K 9/00127 382/128 |
| 2012/0163708 A1* | 6/2012 | Fan | ..................... | G06K 9/4642 382/159 |
| 2012/0328198 A1* | 12/2012 | Takahashi | ............ | G06K 9/6228 382/195 |
| 2014/0010410 A1* | 1/2014 | Sakurai | .............. | G06K 9/00362 382/103 |
| 2014/0037160 A1* | 2/2014 | Matsuzaki | ............ | G06T 7/0012 382/128 |
| 2014/0286568 A1* | 9/2014 | Saruta | .................. | G06K 9/6211 382/159 |
| 2015/0016679 A1* | 1/2015 | Cao | ...................... | G06K 9/4642 382/103 |
| 2016/0026899 A1* | 1/2016 | Wang | .................. | G06K 9/6261 382/176 |

FOREIGN PATENT DOCUMENTS

| | | |
|---|---|---|
| JP | 2008-257649 A | 10/2008 |
| JP | 2011-216087 A | 10/2011 |
| JP | 4852086 A | 1/2012 |

OTHER PUBLICATIONS

Bastian Leibe, "Robust Object Detection with Interleaved Categorization and Segmentation," journal, Aug. 2007, pp. 1-26, Special Issue on Learning for Vision for learning, International Journal of Computer Vision, Berlin, Heidelberg, Germany.

(Continued)

*Primary Examiner* — Aaron W Carter
(74) *Attorney, Agent, or Firm* — Canon USA, Inc. IP Division

(57) ABSTRACT

An information processing apparatus, for training a classifier that classifies local regions of an object, includes a feature amount setting unit, a selection unit, and a training unit. The feature amount setting unit sets a feature amount to be used by the classifier. The selection unit selects a local region of the object based on a predetermined selection condition based on positions for obtaining the feature amount set by the feature amount setting unit. The training unit trains the classifier using the feature amount set by the feature amount setting unit and the local region selected by the selection unit.

14 Claims, 22 Drawing Sheets

(56) References Cited

OTHER PUBLICATIONS

Mustafa Özuysal, "Fast Keypoint Recognition using Random Ferns," journal, Mar. 2010, pp. 448-461 (31 pages), vol. 32, No. 3, IEEE Transactions on Pattern Analysis and Machine Intelligence, Computer Vision Laboratory, École Polytechnique Fédérale de Lausanne (EPFL—Swiss Federal Institute of Technology in Lausanne), Écublens, Vaud, Switzerland.

Herbert Bay, "SURF: Speeded Up Robust Features," journal, Jun. 2008, pp. 346-359 (14 pages), vol. 110, Issue 3, Computing Vision and Image Understanding, Amsterdam, Kingdom of the Netherlands.

Engin Tola, "A Fast Local Descriptor for Dense Matching," journal, 2008, 8 pages, IEEE Conference on Computer Vision and Pattern Recognition, 2008, Computer Vision Laboratory, École Polytechnique Fédérale de Lausanne (EPFL—Swiss Federal Institute of Technology in Lausanne), Écublens, Vaud, Switzerland.

\* cited by examiner

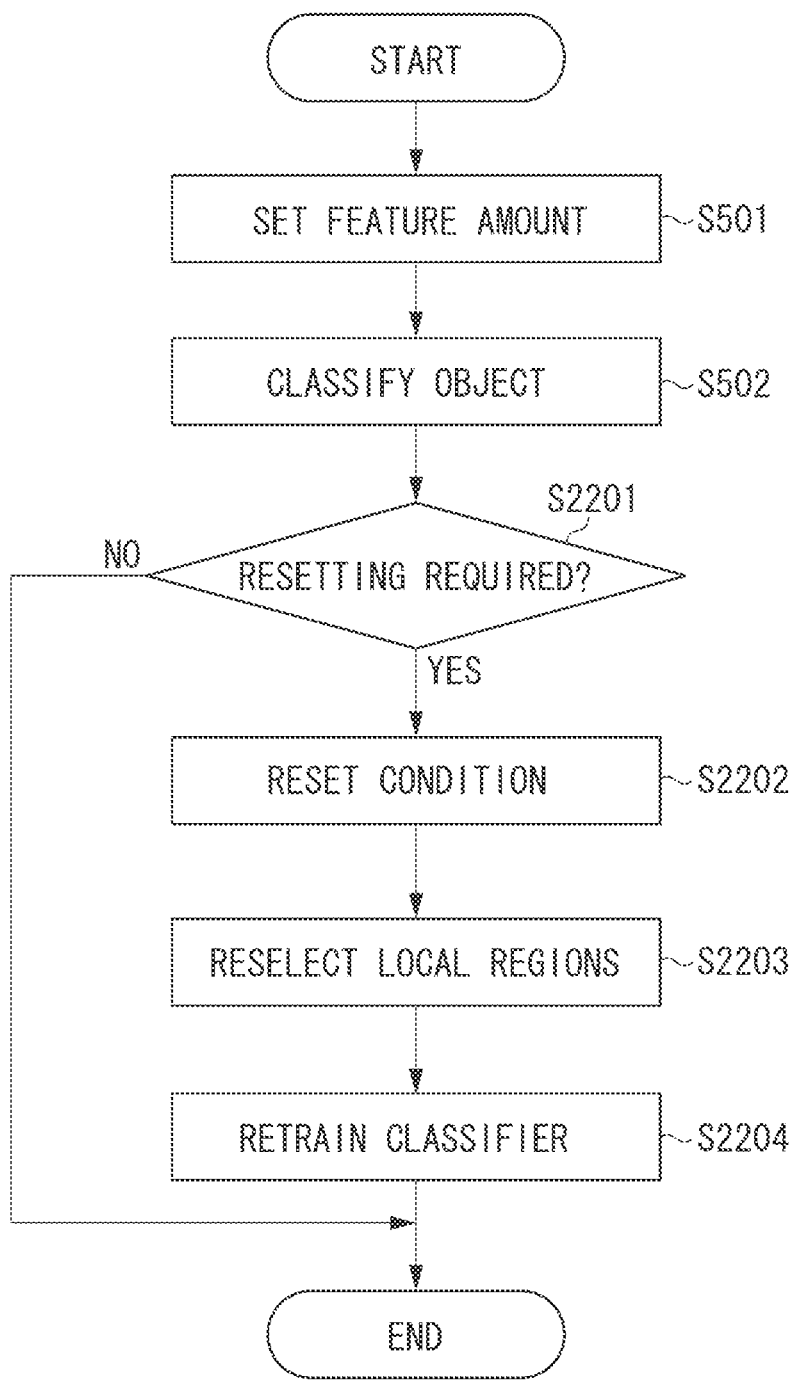

INFORMATION PROCESSING APPARATUS AND TRAINING METHOD

BACKGROUND OF THE INVENTION

1. Field of the Invention

The present invention relates to an information processing apparatus and method for training a classifier.

2. Description of the Related Art

Conventionally, study of object recognition has been conducted on object categorization that is of recognizing unseen-before objects of a given category and assigning the correct category label. Further, a study has been conducted on estimating, by using model information of the object, the position and the orientation of the object in addition to object categorization. These techniques are applied, for example, to recognition of positions and orientations of parts for causing a robot to perform a high-level assembly operation.

A method (implicit-shape-model) for associating a codebook of features extracted from training images with detected features and estimating the position of the object center by probabilistic voting is discussed in B. Leibe's "Robust Object Detection with Interleaved Categorization and Segmentation", IJCV Special Issue on Learning for Vision for learning, August 2007. According to the method, not only the object category, but also the position of the object can be estimated.

In the method discussed in Japanese Patent Application Laid-Open No. 2008-257649, feature points are extracted from an input image to calculate feature amounts thereof, and a feature point in the input image having a similar feature amount to that of a feature point in the training image is set to be a corresponding point. Then, for each corresponding point in the input image, based on the feature amount (including the position information) of the corresponding feature point in the training image, a vote is casted for a reference point so that the object category is classified and the position thereof is also estimated.

To increase the recognition accuracy, it is important to appropriately select feature points and feature amounts of the feature points. In place of the feature points, partial regions (hereinafter referred to as local regions) of an object may be used. Japanese Patent Application Laid-Open No. 2011-216087 discusses a technique for, in each node in a tree structure created in a training process, extracting feature amounts from a region (foreground region) where a recognition target object exists so that the object can be recognized in a state where the background frequently changes.

Further, Japanese Patent No. 4852086 discusses a technique for, in an important part for recognition, closely arranging local regions to be used for recognition processing by using a loss function for obtaining a loss value for the degree of similarity or dissimilarity between an input pattern and a standard pattern.

When an object is to be classified, the object is classified based on training images. Accordingly, to improve the object recognition accuracy, it is important to accurately train a classifier and select important training images. Unfortunately, conventional techniques do not provide enough accuracy to train a classifier and select important training images, and thus the accuracy in classifying an object is not adequate, either.

SUMMARY OF THE INVENTION

According to an aspect of the present invention, an information processing apparatus for training a classifier that classifies local regions of an object includes a feature amount setting unit configured to set a feature amount to be used by the classifier, a selection unit configured to select a local region of the object based on a predetermined selection condition based on positions for obtaining the feature amount set by the feature amount setting unit, and a training unit configured to train the classifier using the feature amount set by the feature amount setting unit and the local region selected by the selection unit.

According to exemplary embodiments of the present invention, it is possible to train a classifier to achieve high classification performance and to accurately classify an object.

Further features of the present invention will become apparent from the following description of exemplary embodiments with reference to the attached drawings.

BRIEF DESCRIPTION OF THE DRAWINGS

FIG. 22 is a flowchart illustrating an example of a processing procedure for recognizing an object by using a trained classifier according to the fifth exemplary embodiment.

DESCRIPTION OF THE EMBODIMENTS

Various exemplary embodiments, features, and aspects of the invention will be described in detail below with reference to the drawings.

Figure 1:
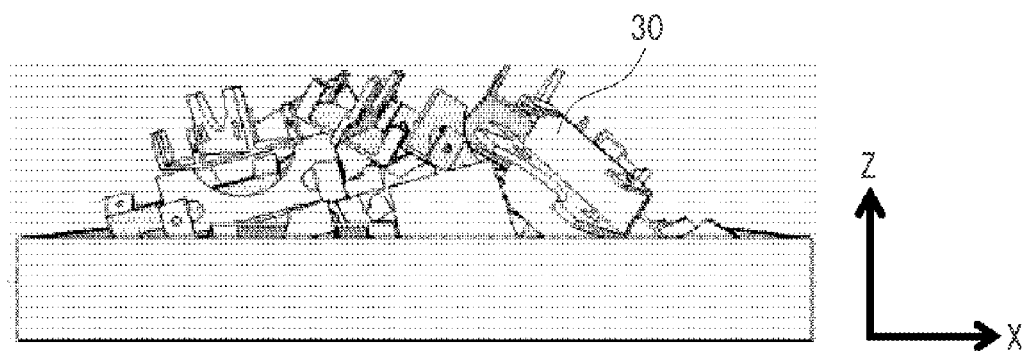
FIG. 1 illustrates a pile of objects.
Figure 2:
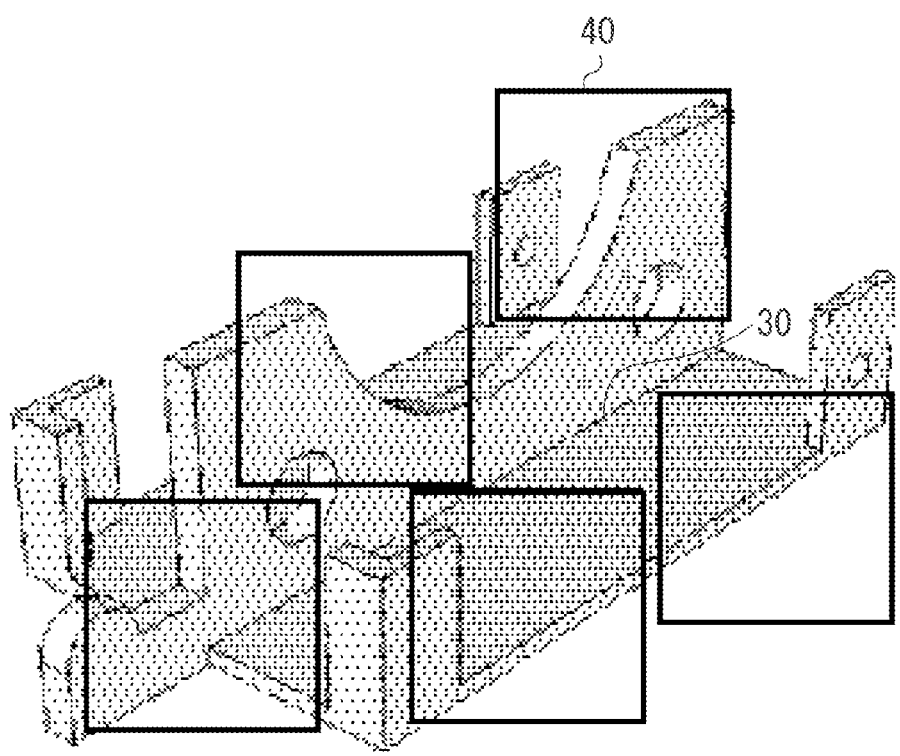
FIG. 2 illustrates local regions of an object.

In a first exemplary embodiment of the present invention, an example will be described in which objects 30 are piled as illustrated in FIG. 1, and in that state, the position and orientation of each object 30 are recognized. Partial regions of the object 30 imaged in each orientation of the object 30, as illustrated in FIG. 2, are local regions 40 to be registered into a classifier.

The information of each of the local regions 40 includes the orientation of the object 30 and the position information in the object 30. Using the classifier to classify the local regions 40 to add the results thereof enables recognition of the position and orientation of the object 30. Thus, in the present exemplary embodiment, the local regions 40 for training of the classifier are appropriately selected according to a preset feature amount and a condition for selecting the local regions 40.

Figure 3:
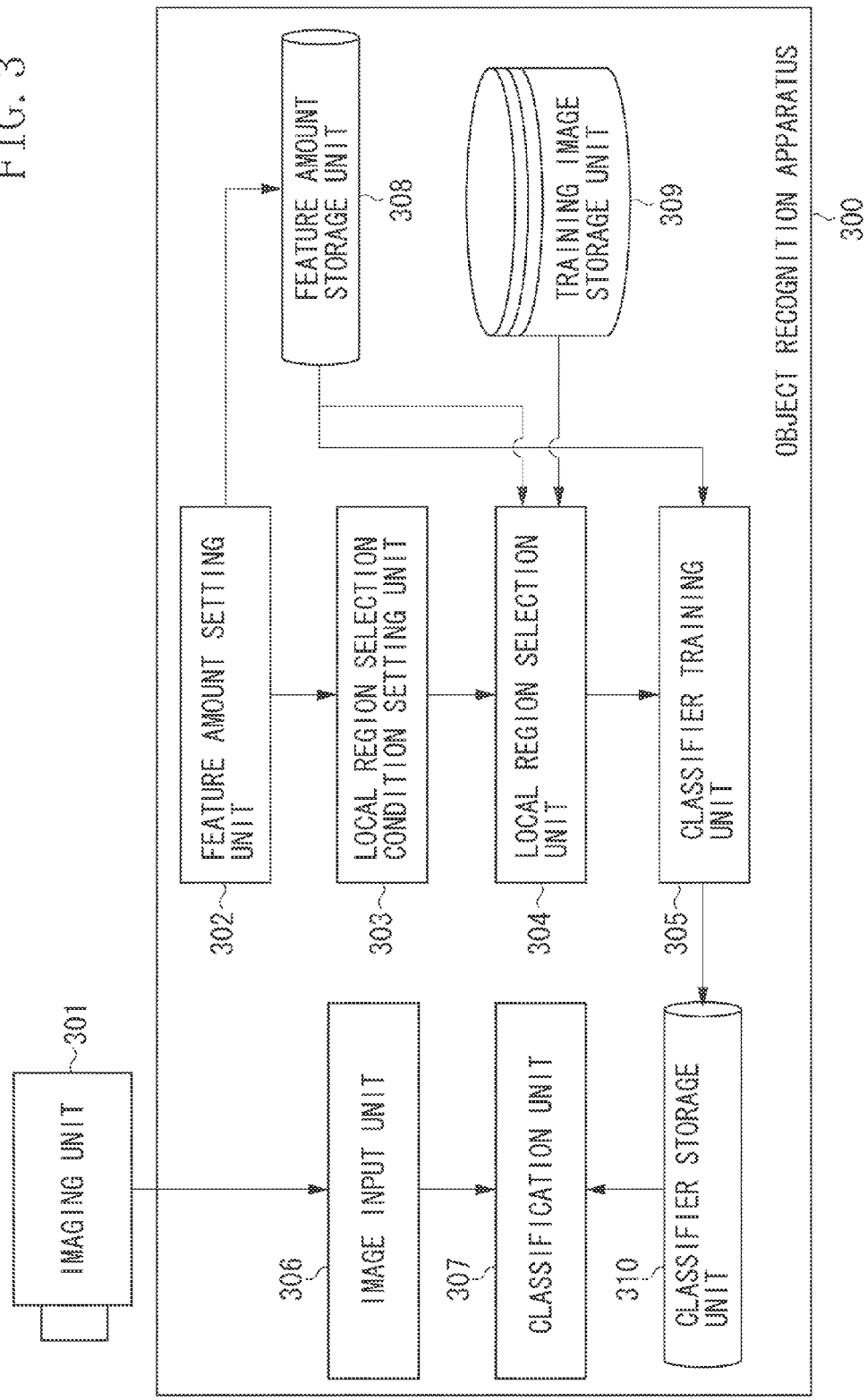
FIG. 3 is a block diagram illustrating a functional configuration example of an object recognition apparatus according to a first exemplary embodiment.

FIG. 3 is a block diagram illustrating a functional configuration example of an object recognition apparatus 300 according to the present exemplary embodiment.

In FIG. 3, an imaging unit 301 captures an image of the object 30 to obtain image data. The object recognition apparatus 300 according to the present exemplary embodiment includes a feature amount setting unit 302, a local region selection condition setting unit 303, a local region selection unit 304, a classifier training unit 305, an image input unit 306, and a classification unit 307. The object recognition apparatus 300 further includes, as storage units, a feature storage unit 308, a training image storage unit 309, and a classifier storage unit 310. Processing performed by the respective units will be described with reference to the following flowcharts.

Figure 4:
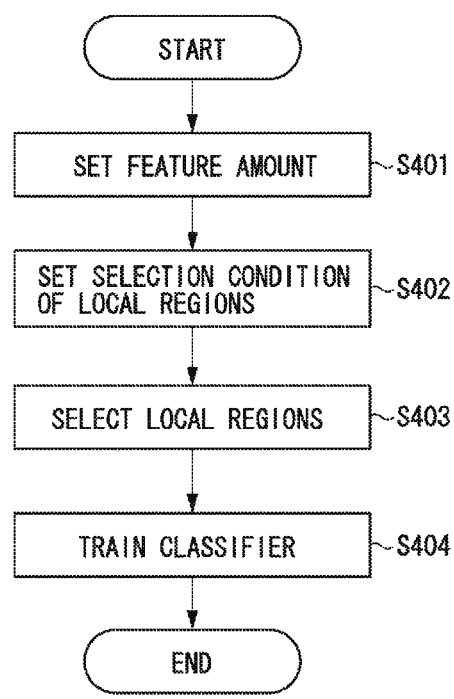
FIG. 4 is a flowchart illustrating an example of a processing procedure for training a classifier according to the first exemplary embodiment.

FIG. 4 is a flowchart illustrating an example of a processing procedure for training a classifier.

In step S401, the feature amount setting unit 302 sets a feature amount to be used by the classifier. As the method for setting the feature amount, registering a feature amount in response to a user operation via an operation unit (not illustrated) or allowing a user to select a feature amount from the feature amounts registered in advance may be employed. The feature amount will be specifically described below. The set feature amount is stored in the feature amount storage unit 308.

In step S402, the local region selection condition setting unit 303 sets a condition for selecting the local regions 40 for training. The condition may also be registered in response to a user operation, or may be selected by a user from the conditions registered in advance. Alternatively, prior to starting the processing illustrated in FIG. 4, the condition for selecting the local regions 40 may be determined in advance to skip this step. The set selection condition is output to the local region selection unit 304.

In step S403, the local region selection unit 304 selects the local regions 40 for training, based on the feature amount and the local region selection condition set in steps S401 and S402, respectively, or only on the local region selection condition. Training images for selecting the local regions 40 are stored in the training image storage unit 309. The selected local regions 40 are output to the classifier training unit 305. The processing in steps S401 to S403 is distinctive, and therefore will be described in detail below.

In step S404, the classifier training unit 305 trains a classifier to classify the local regions 40 selected in step S403. The classifier will be specifically described below. The trained classifier is stored in the classifier storage unit 310.

Figure 5:
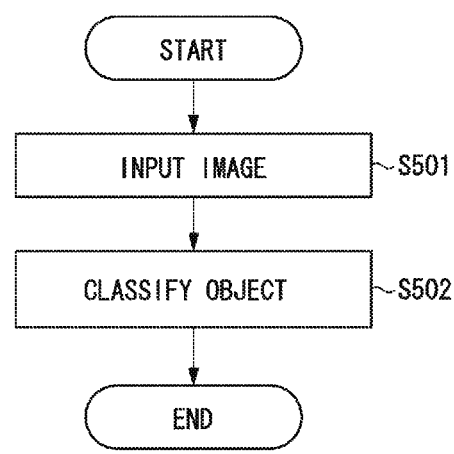
FIG. 5 is a flowchart illustrating an example of a processing procedure for recognizing an object using a trained classifier.

FIG. 5 is a flowchart illustrating an example of a processing procedure for recognizing the object 30 using a trained classifier.

In step S501, the image input unit 306 inputs an image of the object 30 captured by the imaging unit 301. In step S502, the classification unit 307 classifies, by using the classifier stored in the classifier storage unit 310, the image of the object 30 input by the image input unit 306, and outputs the class of the object 30.

Figure 6:
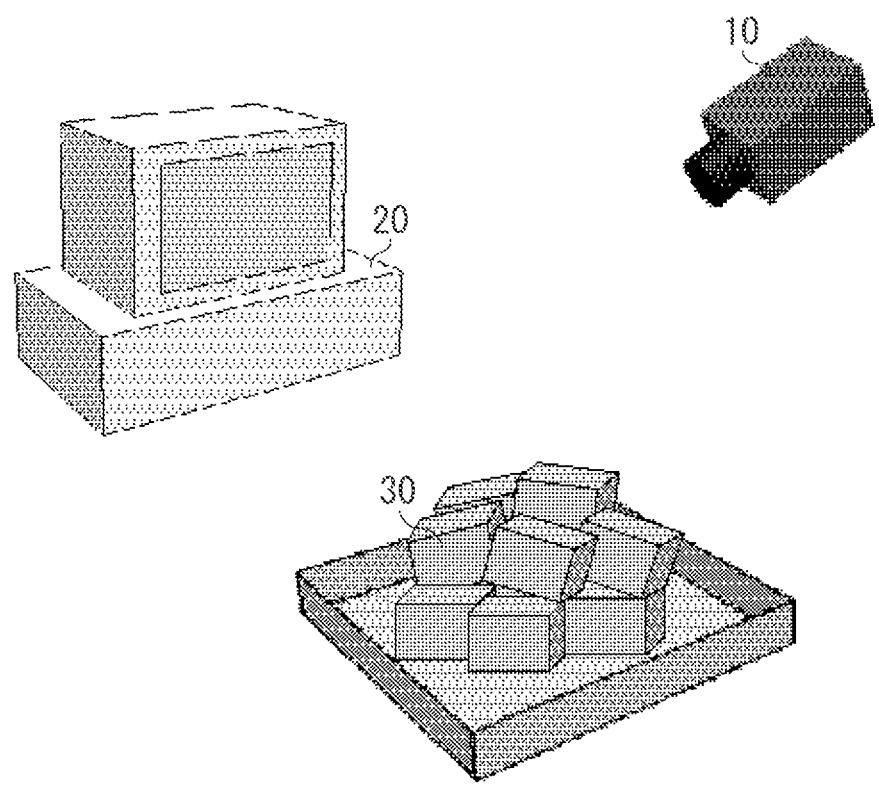
FIG. 6 illustrates a state where an image of objects is being captured.

FIG. 6 illustrates a state where an image of the object 30 is being captured.

In FIG. 6, a camera 10 corresponds to the imaging unit 301 illustrated in FIG. 3, and the camera 10 is capturing an image of the object 30 to be recognized. A calculator 20 corresponds to the object recognition apparatus 300 illustrated in FIG. 3. The calculator 20 has the above-described configuration illustrated in FIG. 3. The feature amount storage unit 308, the training image storage unit 309, and the classifier storage unit 310 may be configured as a nonvolatile storage device (not illustrated) connected to the calculator 20.

With reference to the flowcharts illustrated in FIGS. 4 and 5, the training processing and the classification processing will be specifically described. First, the basic methods for the training processing and the classification processing will be briefly described.

In the present exemplary embodiment, a Fern-based classifier discussed, for example, in "Fast Keypoint Recognition using Random Ferns" by Mustafa Ozuysal, Michael Calonder, Vincent Lepetit and Pascal Fua, IEEE Transactions on Pattern Analysis and Machine Intelligence, Vol. 32, No. 3, pp. 448-461, March 2010 is used. The Fern-based classifier has a plurality of element classifiers arranged therein. As the element classifier, generally, a relatively simple binary decision is used. More specifically, an element classifier that discriminates data based on some simple classification rules and outputs 0 or 1 as a result is used. The number of element classifiers constituting the Fern-based classifier is arbitrarily determined. In the present exemplary embodiment, Fern-based classifiers each having 16 element classifiers are used. Since each of the element classifier outputs 0 or 1 as a result, when 16 element classifiers are used, the total output results are from "0000000000000000" to "1111111111111111". Thus, any one of $2^{16}=65536$ possible results can be obtained as a result. In the training process, among 65536 results, a result is obtained from each of the local regions 40 to be classified and recorded. A plurality of such Fern-based classifiers is used for the discrimination processing.

Figure 7:
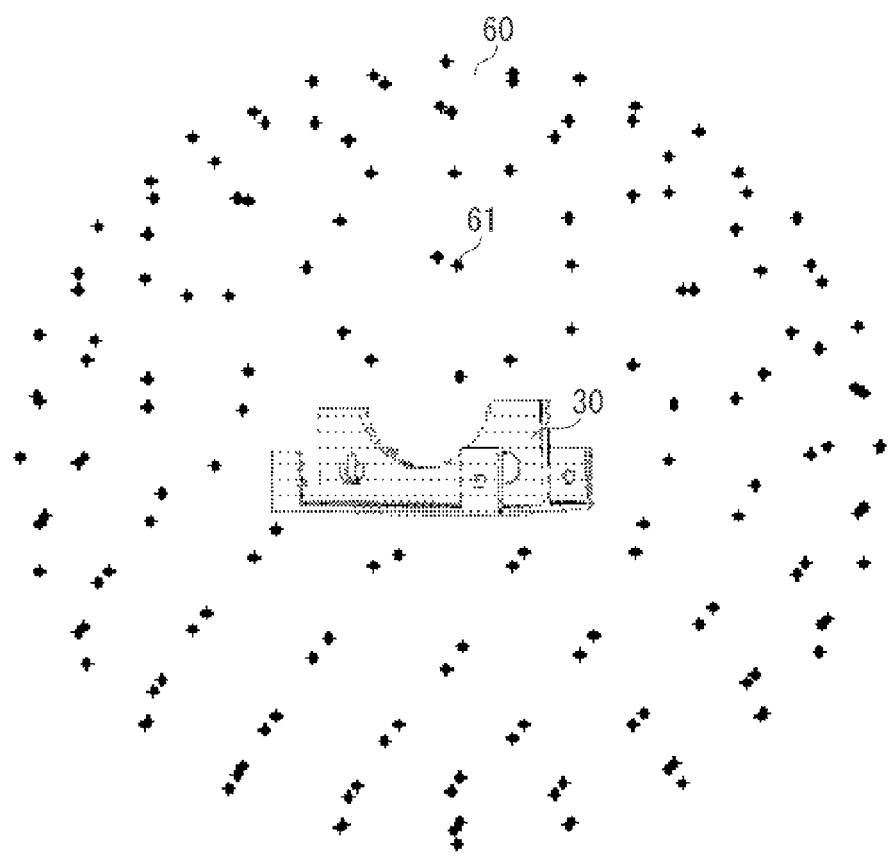
FIG. 7 illustrates a state where an image of an object is being captured from each viewpoint of a geodesic dome.
Figure 8A:
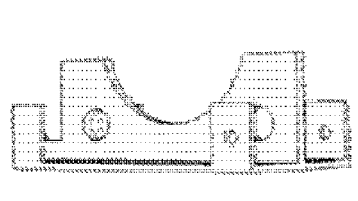
FIGS. 8A, 8B, 8C, 8D, and 8E each illustrates an example of a training image.
Figure 8B:
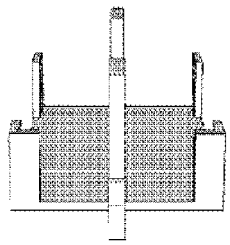
Figure 8C:
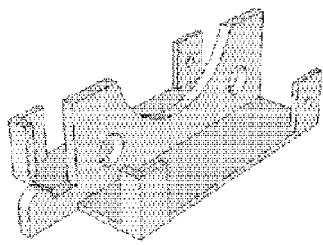
Figure 8D:
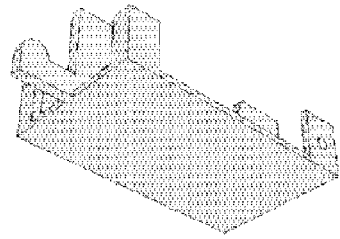
Figure 8E:
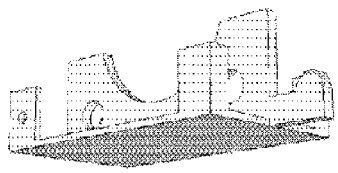

In the present exemplary embodiment, by using the Fern-based classifiers, the local regions 40 indicating partial regions of the object 30 are classified. Processing of determining from which positions the local regions 40 are to be obtained will be described below as specific processing in step S403. As training images of the object 30 according to the present exemplary embodiment, as illustrated in FIG. 7, training images captured from respective viewpoints 61 in a geodesic dome 60 surrounding the object 30 are used. FIGS. 8A to 8E illustrate examples of the training images.

Figure 9:
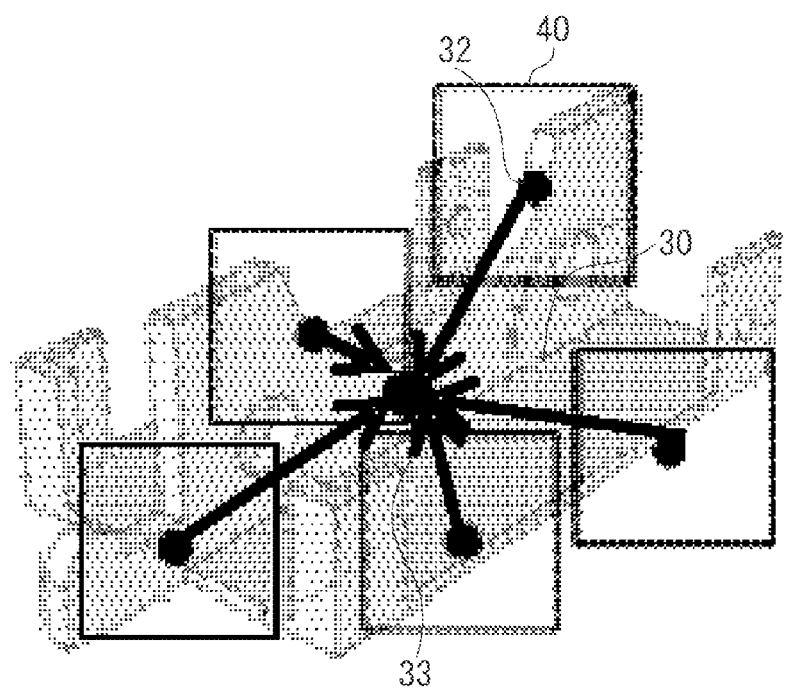
FIG. 9 illustrates a relationship between local regions and a center of an object.

In the classification process, by classifying each of the local regions 40 using the Fern-based classifiers, the orientation and position of the object 30 in an input image can be recognized. For recognition, for example, as illustrated in FIG. 9, a vector (x, y) from a center 32 of each of the local region 40 to a center 33 of the object 30 in a training image of the object 30 having an orientation θ has been recorded in advance.

Figure 10:
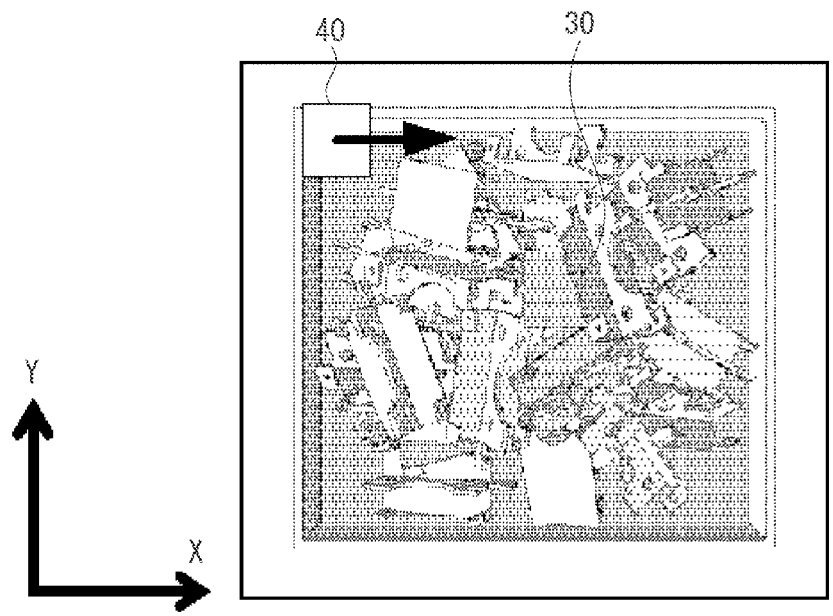
FIG. 10 illustrates a scanning method for recognizing piled objects.

For example, in the classification process, from the piled objects 30 illustrated in FIG. 10, the position and orientation of each object 30 are recognized. In this process, while the image is being scanned as illustrated in FIG. 10, the local region corresponding to each region 40 in the image is classified using the pre-trained classifiers, and based on the information added to each of the local regions 40, votes are casted in a voting space. If a position being scanned in the image is (u, v), a position (X, Y, ID) to be voted is calculated according to the following equation (1):

$$(X, Y, ID) = (u+x, v+y, \theta) \quad (1)$$

Figure 11:
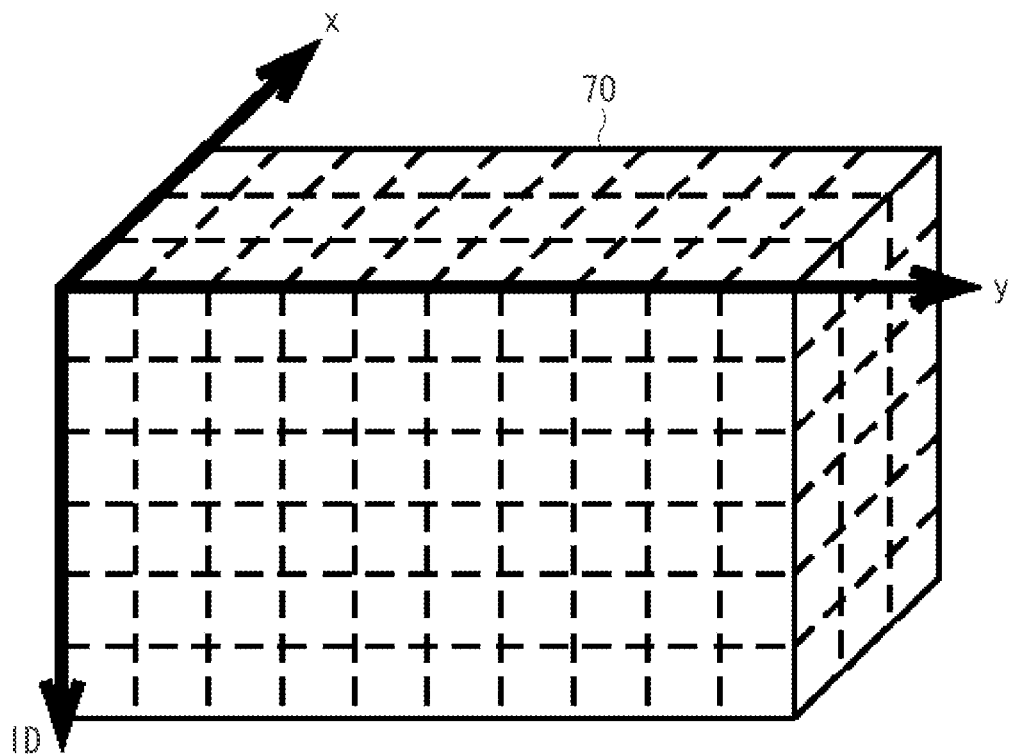
FIG. 11 illustrates an example of a voting space to be used for recognition.

In the equation, ID indicates a class, and in this case, indicates an orientation of the object 30. Finally, a position $(X_{max}, Y_{max}, ID_{max})$ having the maximum number of votes in a voting space 70 illustrated in FIG. 11 is detected. By the processing, it is determined that the object 30 exists at the position $(X_{max}, Y_{max})$ in the orientation registered in a class $ID_{max}$. In this example, the orientation is defined as the class ID to classify the orientation. However, anything, for example, the object category may be used as the class ID.

Next, the processing in each step in FIGS. 4 and 5 will specifically be described.

In step S401 illustrated in FIG. 4, a feature to be used in the training process and the classification process is set in advance. In the present exemplary embodiment, since the Fern-based classifiers are used, a binary decision result based on a magnitude comparison of relatively simple values of two points is employed as the feature amount. For example, values of two points (hereinafter referred to as a reference point 1 and a reference point 2) of different positions are compared to each other to determine the magnitude relationship between the reference points 1 and 2 and output 0 or 1 as a result.

Figure 12A:
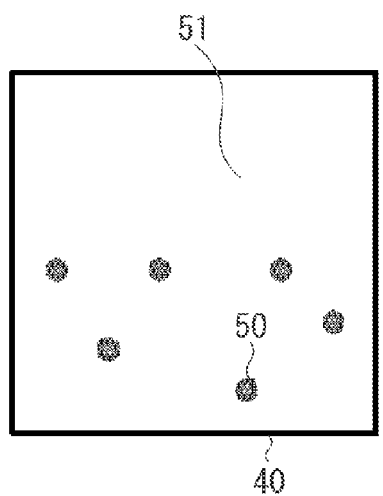
FIGS. 12A and 12B each illustrates positions for obtaining a feature amount in a local region.

In step S401, the positions of the reference points 1 and 2 to be referenced in each classifier are determined. In the present exemplary embodiment, the center of the local region 40 is defined as the reference position, and a combination of relative positions from the reference position is set as the reference points 1 and 2. According to the number of classifiers, i.e., 16, the number of combinations of the relative positions is 16. Any positions may be selected as the reference points 1 and 2. For example, as illustrated in FIG. 12A, in the local region 40, the reference point 1 (a point 50 in FIG. 12A) and the reference point 2 (a point 51 in FIG. 12A) are set at random positions. In another example, either the reference point 1 or the reference point 2 is fixed to the center (or a specific point) of the local region 40, and the other reference point is set at a random position. In the example illustrated in FIG. 12B, the reference point 1 is fixed to the center of the local region 40, and the reference position 2 is set at a random position.

In the above-described example, the reference points are set at random positions. Alternatively, all reference points may be set by the user. Further, from a plurality of points set in advance, the user may select the reference points. As described in the present exemplary embodiment, in a case where a plurality of classifiers are used, positions for the reference points may be set for each classifier.

In the present exemplary embodiment, as the feature amount, the binary decision result based on the magnitude comparison of relatively simple values of two points has been described. Alternatively, the feature amount may be set in such a way to extract features within the local region 40 and output 0 or 1 as a result according to a rule. As the method for extracting features, describing the information about the gradient of intensity around extracted feature points, such as Speeded-Up Robust Features (SURF) discussed in H. Bay's "Speeded-Up Robust Features (SURF)", Computing Vision and Image Understanding, Vol. 110 (3) June 2008, pp. 346-359.4 may be employed. Alternatively, other features, for example, keypoints discussed in E. Tola's "A Fast Local Descriptor for Dense Matching", CVPR 2008, may be employed. Further, image patches, edgelet features, or histogram features in a local image may be employed.

If such features are used as the feature amount for the Fern-based classifiers, it is necessary to determine in advance a condition for each element classifier to output 0 or 1 as a result. For example, 0 or 1 may be output by performing a magnitude comparison with a predetermined threshold according to a value in a dimension, or 0 or 1 may be output with respect to a predetermined threshold by defining a standard feature and calculating a $\chi 2$ distance to the feature. At this time, the threshold may be set by the user, or the threshold may be selected to improve the branching accuracy in training the classifiers. For example, the threshold may be selected in such a way that, in the local regions 40 registered in training, the number of local regions 40 determined as 0 is approximately equal to the number of local regions 40 determined as 1. Further, if pre-processing such as edge extraction is performed prior to acquiring feature amounts, it is also necessary to determine the pre-processing in this step.

Figure 13:
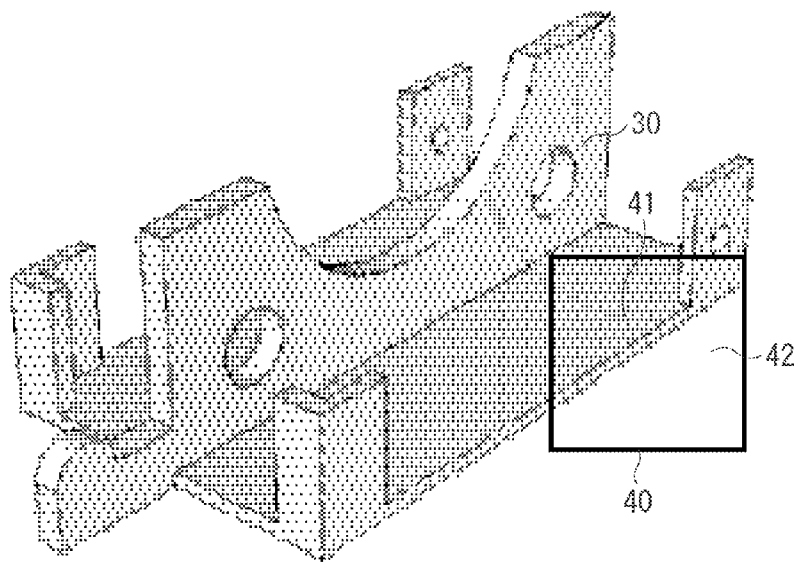
FIG. 13 illustrates a foreground and a background in a local region.

In step S402, a condition for selecting the local regions 40 to be registered in training is set. In the present exemplary embodiment, as the condition for selecting the local regions 40, a foreground rate in the local region 40 is set. A foreground in the local region 40 is, as illustrated in FIG. 13, a part 41 where the object 30 is captured in the local region 40. A background 42 indicates the background in the local region 40. The foreground rate in the local region 40 is the rate of an object region to the local region 40. The foreground rate is calculated according to the following equation (2), and in the case of the example illustrated in FIG. 13, the foreground rate is calculated according to the following equation (3).

(Foreground rate)=(the area of an object region in a local region)/(the area of the local region)    (2)

(Foreground rate)=(the area of the region of the part 41)/(the area of the regions of the part 41+the background 42)    (3)

For example, if the foreground rate in the local region 40 is 100%, the local region 40 is completely included in the object region, and if the foreground rate in the local region 40 is 0%, the local region 40 is placed outside the object region. When the above-described Fern-based classifiers are used, the number of positions for obtaining the feature amount is 16×2=32 points, and accordingly, as indicated by the following equation (4), the foreground rate is a value indicating how many points are referencing the object region out of the 32 points.

(Foreground rate)=(the number of points referring to an object region in a local region)/(the total number of points)    (4)

The foreground rate may be set by the user, or may be set in advance. Further, the foreground rate may be set to an appropriate numeric value, for example, 50% or 100%, or a range, for example, 50% or more, or 20% or more to 80% or less can be set.

In step S403, the local region selection unit 304 selects the local regions 40 to be registered in training, based on both the feature amount and the selection condition determined in steps S401 and S402, respectively, or only the selection condition.

First, the method of selecting the local regions 40 based on only the selection condition will be described. For example, if the feature amount is a statistic in the local region 40, the local region 40 can be selected based on only the selection condition. In this case, defining the foreground rate in the local region 40 determines where in the object region the local regions 40 can be arranged.

Figure 14:
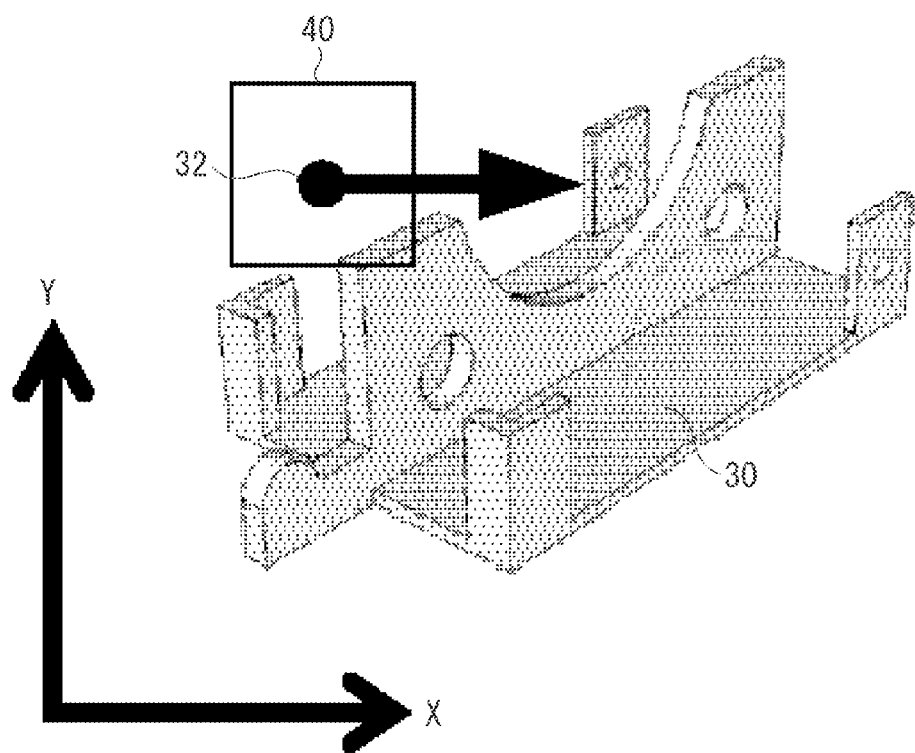
FIG. 14 illustrates a method for arranging local regions.

As illustrated in FIG. 14, in a training image of the object 30 having a certain orientation, the local region 40 is scanned, and the foreground rate at each position (which is indicated in FIG. 14 as the position of the center 32 in the local region 40) is calculated to check whether the calculated foreground rate satisfies the set foreground rate. In this example, the foreground rate at the position (X, Y) in a local region N is defined as F (X, Y). The position (X, Y) indicates the center position in the local region 40 in the object image coordinate system. If the size of a local region and an object image (or a model of the object and the orientation thereof) are given, F (X, Y) can be calculated. If the set foreground rate is F, the position (X, Y) that satisfies the following equation (5) is searched for.

$$F(X,Y) > F \quad (5)$$

According to the method, after the local region 40 is scanned in the object image, the center of the local region 40 is defined as (X, Y) to arrange the local region 40. As the arrangement method, the local region 40 may be selected randomly from (X, Y) that satisfies the equation (5), or may be registered by a user. Further, the number of local regions 40 may be set in advance, or the local regions 40 may be registered as many as possible. If a plurality of classifiers such as the Fern-based classifiers are used, the position of the local region 40 may be changed for each classifier.

According to the above-described method, the local region 40 corresponding to the feature amount and the selection condition determined in steps S401 and S402, respectively can be selected. Setting the foreground rate enables training of many foregrounds of the object 30. Accordingly, in a state where the background is cluttered as illustrated in FIG. 10, the position and orientation of the object 30 can be recognized with high accuracy.

Next, a method of selecting the local regions 40 based on both the feature amount and the selection condition will be described.

For example, in a case where the positions for obtaining the feature amount are determined in the local region 40, it is necessary to consider both the positions for obtaining the feature amount and the selection condition. In the example illustrated in FIG. 12A, in a case where the reference points 1 and 2 are set at random positions, data on whether each of the positions is a foreground is compiled and the local region 40 is arranged at a position that satisfies the foreground rate. On the other hand, in the example illustrated in FIG. 12B, in a case where either the reference point 1 or the reference point 2 is fixed to the center (or a specific point) of the local region 40, the other reference point is set at a random position, and the foreground rate is set to 50% or more, the center position of the local region 40 may be any position in the object region.

Although the foreground rate has been described in the above example, depending on the feature amount, any statistic in the local region 40, such as an edge rate in the local region 40, may be employed. As long as a statistic can be uniquely described when the position of the local region 40 has been determined in a training image of the object 30, any statistic can be employed. If a distance image is used as an image, the reliability of the distance image can be employed, for example. In the case of the edge rate, the edge rate in the local region 40 can be calculated according to the following equation (6):

(Edge rate)=(the number of edge pixels in a local region)/(the number of pixels in the local region)   (6)

In the case of the reliability of a distance image, the distance data of each point in a training image and the reliability of the distance data are prepared in advance. In the reliability calculation method, if the method of obtaining a distance image is a stereo method, on the edge of the object image, the reliability is high, and on the plane, the reliability is low. On the other hand, if the distance data is obtained by a method such as a light-section method, on the plane, the reliability is high. Alternatively, by using a camera position, the reliability may be determined based on the angle between the camera position and the normal vector of each point. After calculation of the reliability at each point using such methods, according to the following equation (7), the reliability of the local region 40 is calculated.

(Reliability)=Σ(reliability at each point in a local region)/(the number of pixels in the local region).   (7)

In step S404, the classifiers are trained to discriminate the local regions 40 selected in step S403 by using the feature amount set in step S401. In the above-described example, the classifiers are trained to discriminate 126000 local regions. Each of the local regions 40 is assigned to any one of 65536 leaves by using the element classifiers set in step S401. Then, information about which leaf each of the local regions 40 has been assigned to (leaf information) is recorded. The above-described operation is performed on each Fern-based classifier. Here, 50 Fern-based classifiers are trained and then stored in the classifier storage unit 310.

Next, specific processing in each step in the recognition processing will be described.

In step S501, an image containing many objects 30, for example, the image illustrated in FIG. 10 is input. The image may be input from the imaging unit 301, or an image that has been obtained in advance may be input from an external device.

In step S502, using the Fern-based classifiers stored in the classifier storage unit 310, the position and orientation of each object 30 are discriminated. As described above, the image is scanned as illustrated in FIG. 10, and based on the classification results of each of the local regions 40, votes are casted in the voting space. Then, $(X_{max}, Y_{max}, ID_{max})$ having the maximum number of votes in the voting space is detected to recognize the object 30. By the processing, it is determined that the object 30 exists at the position $(X_{max}, Y_{max})$ in the orientation registered in $ID_{max}$. Accordingly, it can be recognized that the object 30 exists in the orientation and the in-plane rotational angle registered in the $ID_{max}$ at the position $(X_{max}, Y_{max})$ in the image.

The present exemplary embodiment has been described using the Fern-based classifiers. Alternatively, any algorithm that can classify each of the local regions 40, such as a support vector machine (SVM) and a k-nearest neighbors, may be employed.

As described above, according to the present exemplary embodiment, the local regions 40 to be registered in training of the classifiers are appropriately selected based on the preset feature amount and the condition for selecting the local regions 40, so that the accuracy in recognizing the object 30 can be increased.

In a second exemplary embodiment, after the local regions 40 are selected according to the preset feature amount and the condition for selecting the local regions 40, at least one of the feature amount and the condition for selecting the local regions 40 is changed based on the selected local regions 40. Then, the local regions 40 to be registered into the classifiers are reselected, and the classifiers are retrained.

Figure 15:
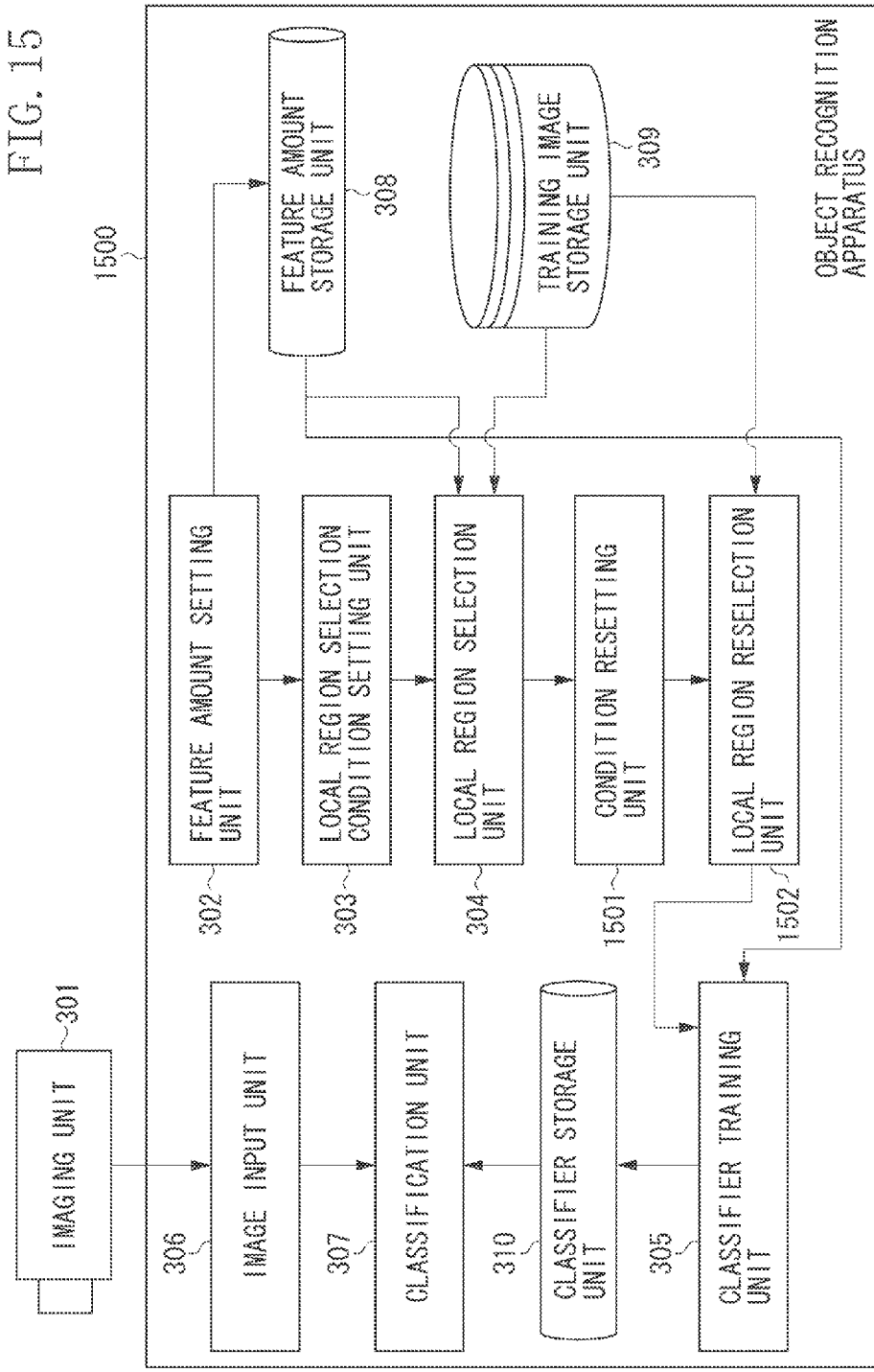
FIG. 15 is a block diagram illustrating a functional configuration example of an object recognition apparatus according to a second exemplary embodiment.

FIG. 15 is a block diagram illustrating a functional configuration example of an object recognition apparatus 1500 according to the present exemplary embodiment. The object recognition apparatus 1500 according to the present exemplary embodiment includes, in addition to the configuration illustrated in FIG. 3, a condition resetting unit 1501 and a local region reselection unit 1502. These configurations will be described in detail below. The other configurations are similar to those in FIG. 3, and therefore the description thereof is omitted here.

Figure 16:
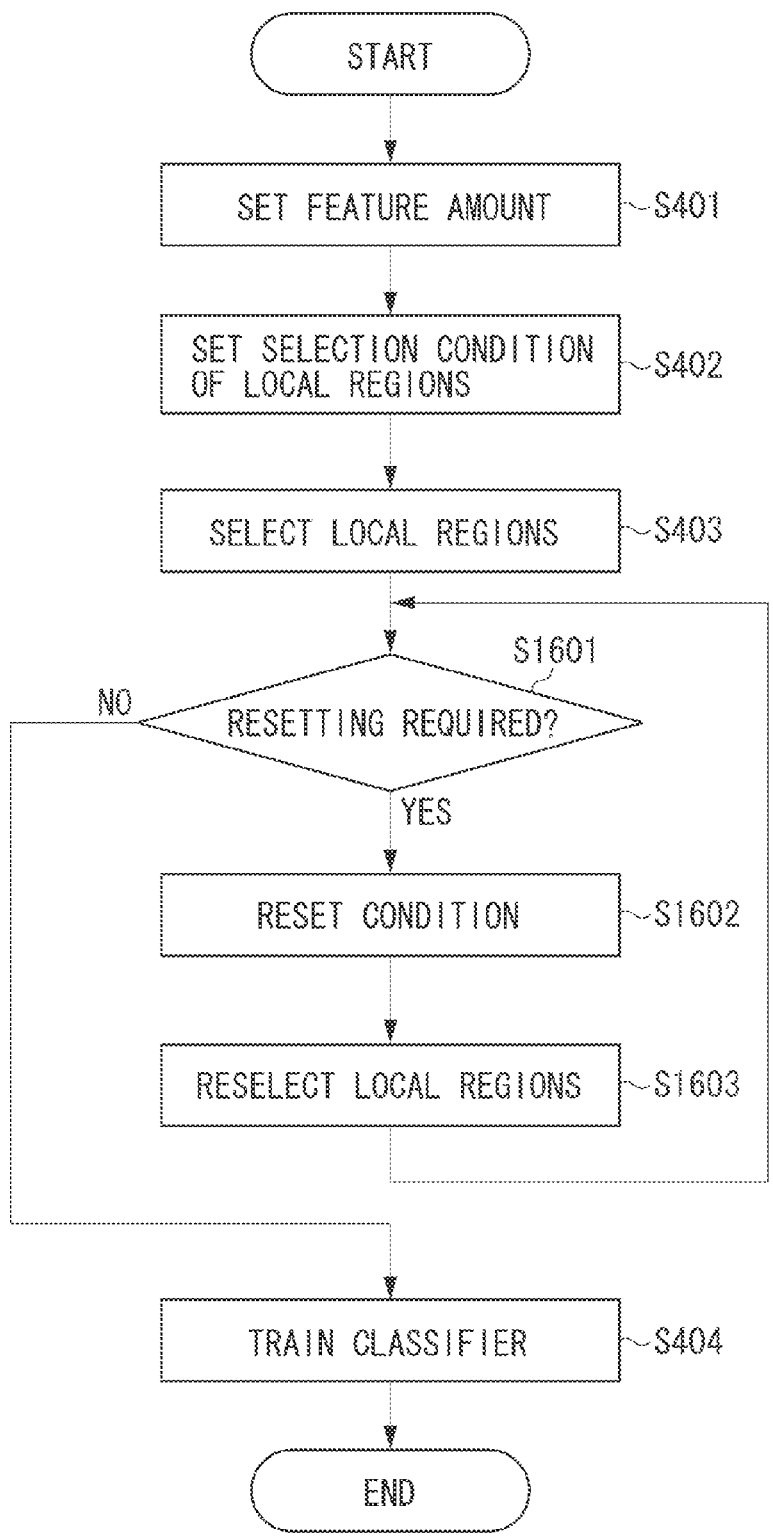
FIG. 16 is a flowchart illustrating an example of a processing procedure for training a classifier according to the second exemplary embodiment.

FIG. 16 is a flowchart illustrating an example of a processing procedure for training a classifier according to the present exemplary embodiment. The processing for recognizing an object using the trained classifier is similar to that in FIG. 5, and therefore the description thereof is omitted here.

The processing in step S401 to S403 is similar to that in step S401 to S403 in FIG. 4.

In step S1601, based on the local regions 40 set in step S403, whether to reset the local regions 40 is determined. The determination method will be described below. As a result of the determination, if the local regions 40 need to be reset (YES in step S1601), the processing proceeds to step S1602. If the local regions 40 do not need to be reset (NO in step S1601), the processing proceeds to step S404. The processing in step S404 is similar to that in step S404 in FIG. 4.

In step S1602, the condition resetting unit 1501 resets the feature amount or the condition for selecting the local regions 40. In step S1603, the local region reselection unit 1502 reselects the local regions 40 based on the feature amount or the condition for selecting the local regions 40 reset in step S1602, and the processing returns to step S1601.

Next, the determination processing in step S1601 will be described in detail. For example, if the foreground rate is set as the condition for selecting the local regions 40, the number of local regions 40 satisfying the foreground rate may be low in some orientations of the object 30. In another case, increasing the foreground rate may increase the tendency of the positions of the local regions 40 to concentrate in the central part of the object 30. To recognize the objects 30 with high accuracy even in a cluttered state or in an occluded state, a large number of local regions 40 should be arranged in a scattered state over the target object image. In view of the above, in the present exemplary embodiment, the number of local regions 40 necessary for recognizing each orientation of the object 30 is determined in advance, and if the predetermined number is not satisfied, it is determined that the resetting is required. Alternatively, the distribution (variance) of the set positions of the local regions 40 is analyzed, and based on the degree of the variance, whether the resetting is required is determined.

In regard to the variance of the positions, if the number of local regions 40 is N and the position of each of the local region 40 is $X_i$ (i=1, 2, ... N), a variance V can be expressed by the following expression (8).

$$V = \sum_{i=1}^{N} (X_i - \overline{X}) \qquad (8)$$

When the variance V is smaller than the predetermined threshold, it is determined that the resetting is required.

Figure 12B:
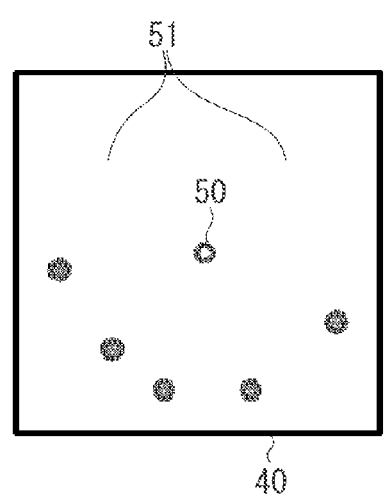

If it is determined that the resetting is required, the feature amount or the condition for selecting the local regions 40 is reset. To change the feature amount, for example, if the reference points 1 and 2 are determined as illustrated in FIGS. 12A and 12B, the reference points 1 and 2 are selected from a region at the further inner side. To reset the condition for selecting the local regions 40, the foreground rate is set to a smaller value. For example, if the foreground rate set in step S402 is F and the reset foreground rate is F', the relationship between F and F' can be expressed by the following equation (9):

$$F' = \alpha F \qquad (9)$$

In the equation, $\alpha$ is defined by a scalar and may be a value of 0.9, for example.

Thus, based on the reset feature or the reset selection condition, the local regions 40 are reselected. Then, whether to reset the local regions 40 is determined, and if the resetting is not required, the classifiers are trained to classify the local regions 40. The other processing is similar to that in the first exemplary embodiment. As described above, according to the present exemplary embodiment, the local regions 40 in each object class to be registered during training of the classifiers are reset in the course of the processing are appropriately selected so that the accuracy in recognizing the object 30 can be improved.

Figure 17:
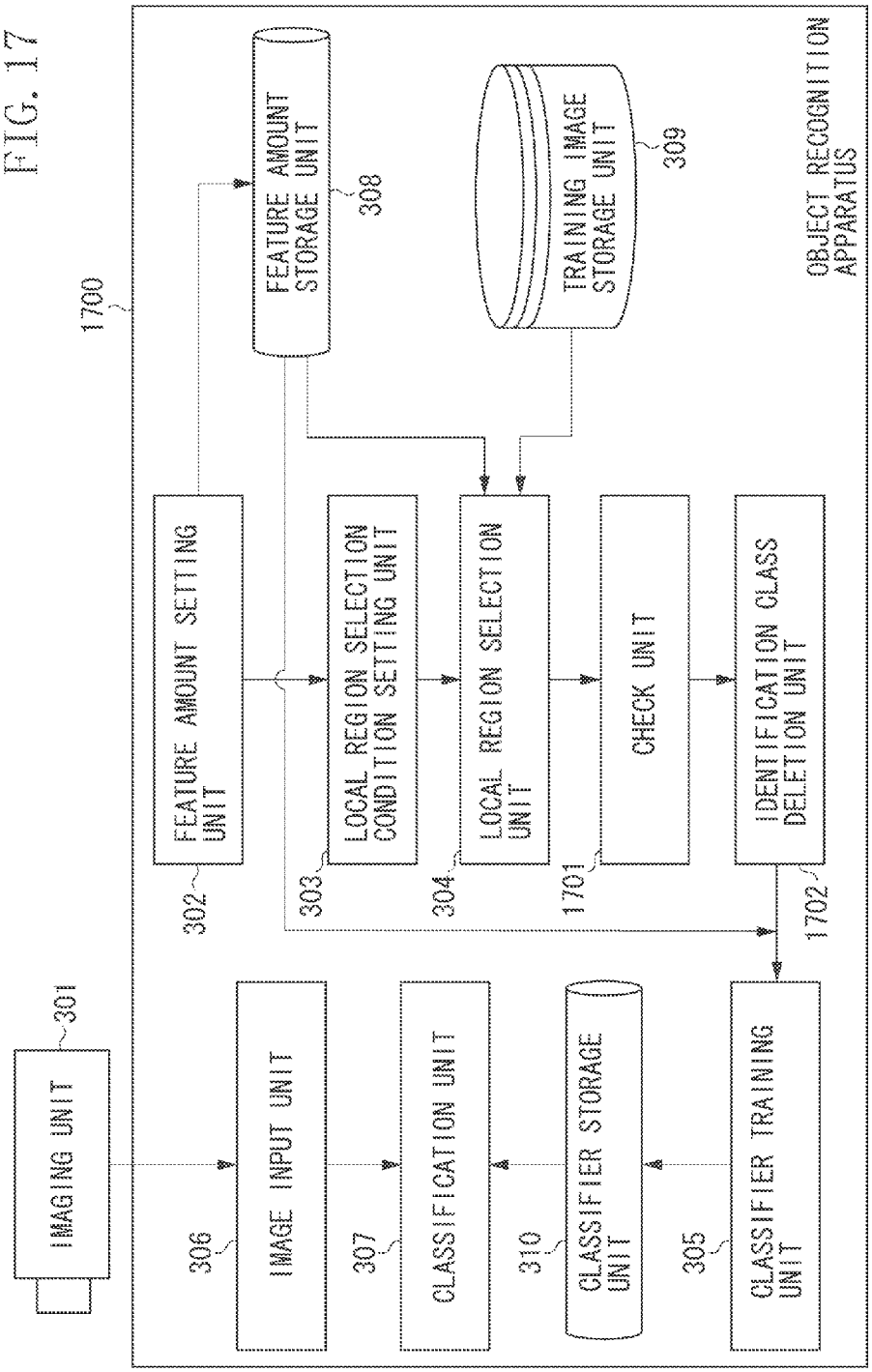
FIG. 17 is a block diagram illustrating a functional configuration example of an object recognition apparatus according to a third exemplary embodiment.

In a third exemplary embodiment, after the local regions 40 in each object class are selected according to the preset feature and the condition for selecting the local regions 40, a class that cannot be classified based on the selected local regions 40 is removed from the discrimination target classes, and the classifiers are trained to classify the remaining object classes. By removing a class that cannot be classified from the training target classes in advance, the recognition accuracy of the remaining object classes can be increased FIG. 17 is a block diagram illustrating a functional configuration example of an object recognition apparatus 1700 according to the present exemplary embodiment. The object recognition apparatus 1700 according to the present exemplary embodiment includes, in addition to the configuration illustrated in FIG. 3, a check unit 1701 and a classification class deletion unit 1702. These configurations will be described in detail below. The other configurations are similar to those in FIG. 3, and therefore the description thereof is omitted here.

Figure 18:
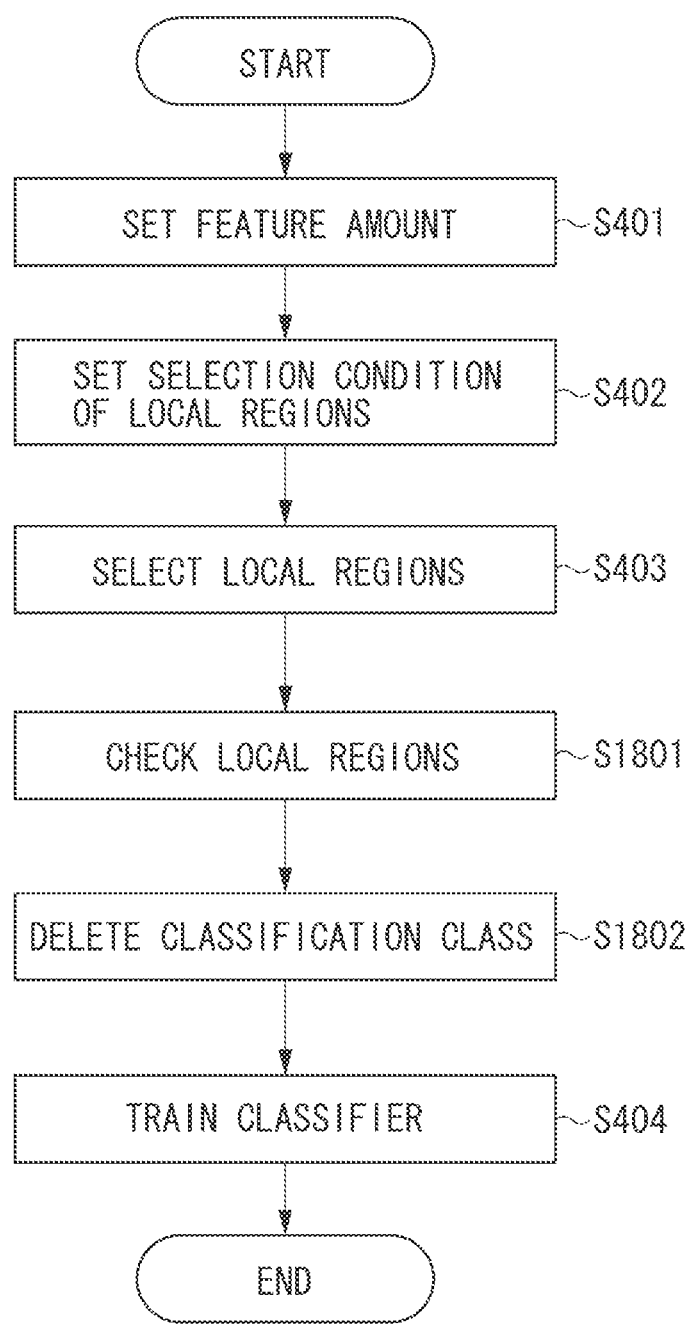
FIG. 18 is a flowchart illustrating an example of a processing procedure for training a classifier according to the third exemplary embodiment.

FIG. 18 is a flowchart illustrating an example of a processing procedure for training a classifier according to the present exemplary embodiment. The processing for recognizing an object using the trained classifier is similar to that in FIG. 5, and therefore the description thereof is omitted here.

The processing in step S401 to S403 is similar to that in step S401 to S403 in FIG. 4.

In step S1801, the check unit 1701 checks the local regions 40 selected in each object class, and determines for each object class whether the class can be classified. As the determination method, similarly to the second exemplary embodiment, the number of the local regions 40 selected in each object class or the degree of variance of the positions thereof is checked. As the method of checking the degree of the variance, the variance V described in the second exemplary embodiment may be used, for example.

In step S1802, the classification class deletion unit 1702 deletes the local regions 40 in the class that has been determined unclassifiable in step S1801 from the local regions 40 to be registered during the training process. The processing in step S404 is similar to that in step S404 in FIG. 4.

As described above, in the present exemplary embodiment, according to the local regions 40 in each object class to be registered during the training process, whether each object class can be classified is determined to limit the number of object classes, and thereby the recognition accuracy can be increased.

In a fourth exemplary embodiment, after the local regions 40 are selected based on the preset feature and the condition for selecting the local regions 40, the weight to be assigned to each of the local regions 40 for classification is determined based on the local regions 40 selected in each object class. Determining the weight to be assigned to the local regions of each object class enables the classification of an object class in which the selection of local regions has been insufficient, and thereby the overall recognition accuracy can be increased.

Figure 19:
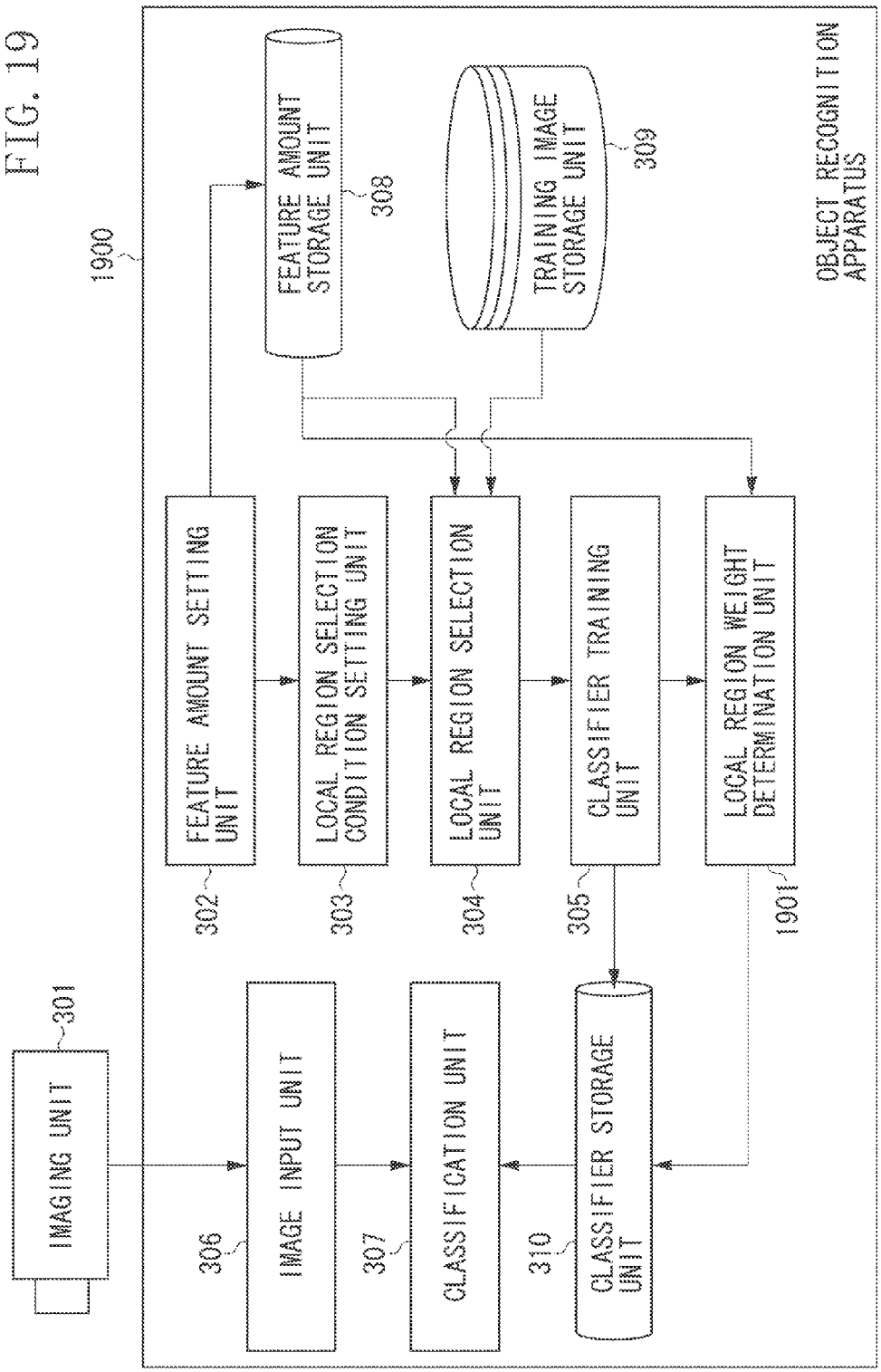
FIG. 19 is a block diagram illustrating a functional configuration example of an object recognition apparatus according to a fourth exemplary embodiment.

FIG. 19 is a block diagram illustrating a functional configuration example of an object recognition apparatus 1900 according to the present exemplary embodiment. The object recognition apparatus 1900 according to the present exemplary embodiment includes, in addition to the configuration illustrated in FIG. 3, a local region weight determination unit 1901. This configuration will be described in detail below. The other configurations are similar to those in FIG. 3, and therefore the description thereof is omitted here.

Figure 20:
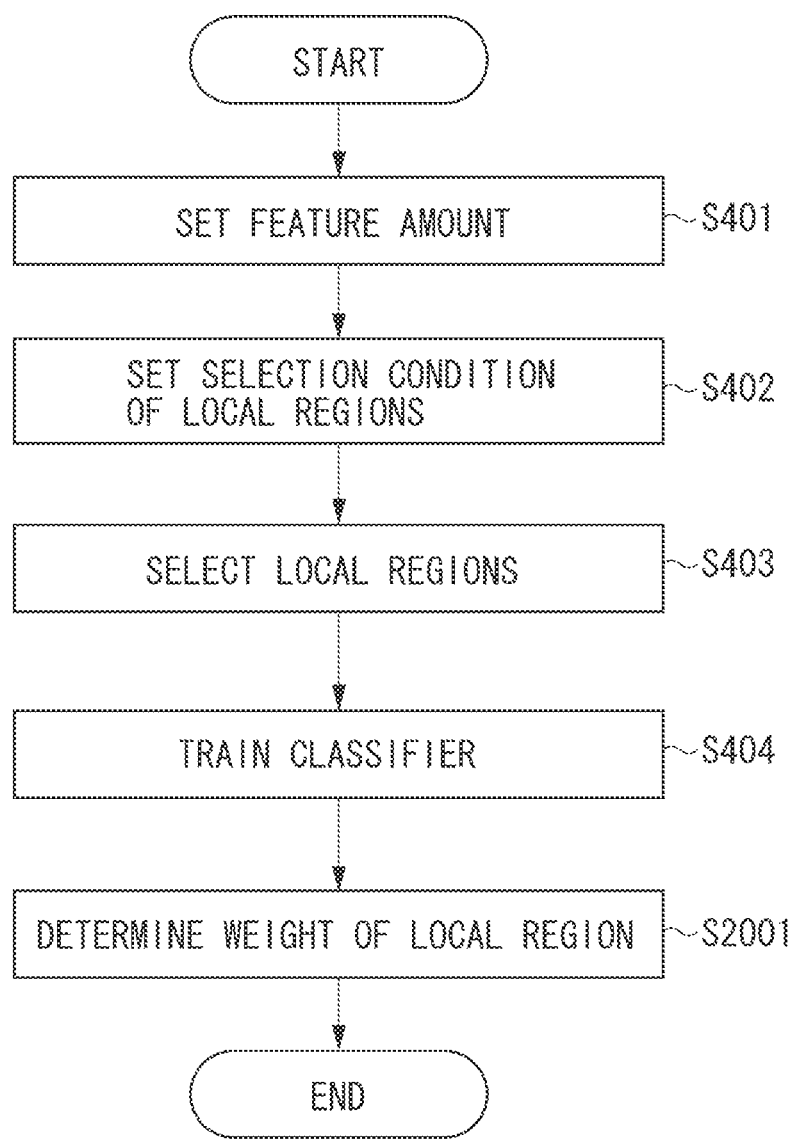
FIG. 20 is a flowchart illustrating an example of a processing procedure for training a classifier according to the fourth exemplary embodiment.

FIG. 20 is a flowchart illustrating an example of a processing procedure for training a classifier according to the present exemplary embodiment. The processing for recognizing an object using the trained classifier is similar to that in FIG. 5, and therefore the description thereof is omitted here.

The processing in step S401 to S403 is similar to that in step S401 to S403 in FIG. 4.

In step S2001, the local region weight determination unit 1901 determines, based on the local regions 40 set in each object class, the weight to be assigned to each of the local regions 40 for classification. In the classification process, the weight is used to perform integrated processing for classification. The determined weight is stored in the classifier storage unit 310 together with the trained classifier. As the method of determining the weight for classification, the weight may be set to 1/(the number of local regions 40) according to the number of local regions 40 set in each object class, or may be set to 1/(the degree of variance) according to the degree of variance of the positions thereof.

The classification processing is similar to that in the first exemplary embodiment. However, in voting, votes are casted after the local regions 40 are weighted according to the weight determined in step S2001. If the number of classes is K, and the weight for each of the local regions 40 is $W_k$ (k=1, 2, . . . K), the position (X, Y, ID) to be voted is weighted by the following equation (10):

$$(X,Y,ID)=(X,Y,ID)+W_k. \quad (10)$$

If the classification result is output as a score S indicating likelihood of the ID, by, for example, an SVM, the position (X, Y, ID) to be voted is weighted by the following equation (11).

$$(X,Y,ID)=(X,Y,ID)+W_k S. \quad (11)$$

As described above, according to the present exemplary embodiment, according to the local regions 40 in each object class to be registered during training of the classifiers, the weight to be assigned to the local regions 40 for classifying each object class is determined. By providing the constant classification capability for all object classes, the robust recognition can be performed.

In a fifth exemplary embodiment, after the recognition processing has been performed using the classifiers trained in the training method according to the first exemplary embodiment, according to the classification result, at least one of the feature and the condition for selecting the local regions 40 is changed, the local regions 40 to be registered into the classifiers are reselected, and then the classifiers are re-trained. To classify the local regions 40 with high accuracy in a cluttered state, it is considered, as the method of changing the local regions 40, to further increase the foreground rate to select the local regions 40 or increase the number of local regions 40 to be selected. The increase in the number of local regions 40 to be selected enables obtaining the local regions 40 at various positions, thereby improving the robustness against occlusion and improving the accuracy in recognizing an object.

Figure 21:
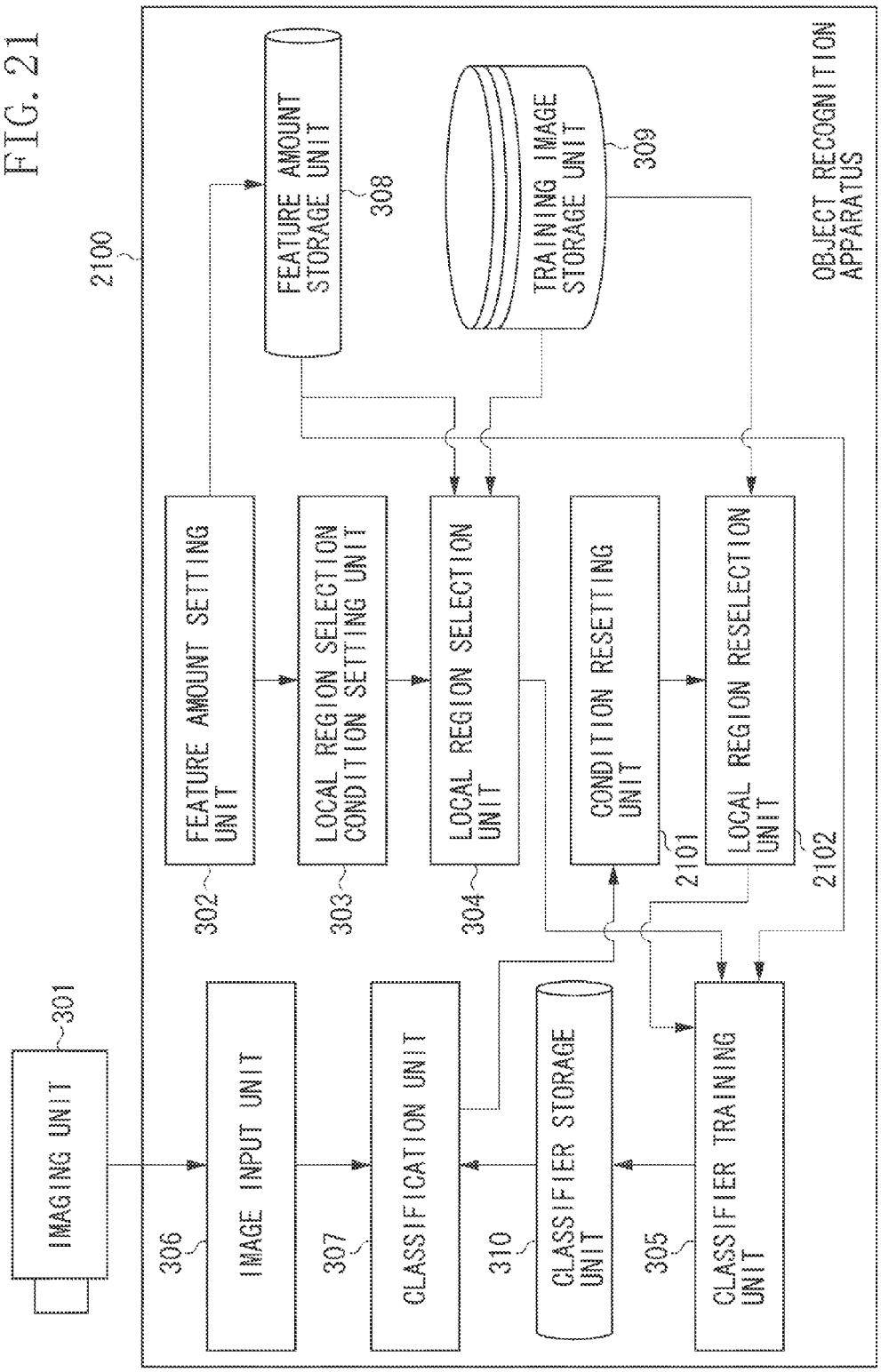
FIG. 21 is a block diagram illustrating a functional configuration example of an object recognition apparatus according to a fifth exemplary embodiment.

FIG. 21 is a block diagram illustrating a functional configuration example of an object recognition apparatus 2100 according to the present exemplary embodiment. The object recognition apparatus 2100 according to the present exemplary embodiment includes, in addition to the configuration illustrated in FIG. 3, a condition resetting unit 2101 and a local region reselection unit 2102. These configurations will be described in detail below. The other configurations are similar to those in FIG. 3, and therefore the description thereof is omitted here.

FIG. 22 is a flowchart illustrating an example of a processing procedure for classifying an object using a trained classifier. The processing for training the classifier is similar to that in FIG. 4, and therefore the description thereof is omitted here.

The processing in step S501 and S502 is similar to that in step S501 and S502 in FIG. 5.

In step S2201, the classification unit 307 evaluates the classifier based on the classification result in step S502. As the method of evaluating the classifier, evaluation data may be prepared, or the user may evaluate the classifier. Alternatively, an evaluation criterion may be provided. For example, in a case where piled objects are gripped by a robot and the positions and orientations of the objects are recognized, a gripping success rate may be evaluated. As a result of the evaluation, if it is determined that the resetting is required (YES in step S2201), the processing proceeds to step S2202. If it is determined that the resetting is not required (NO in step S2201), the processing ends.

In step S2202, the condition resetting unit 2101 resets at least one of the feature amount, the condition for selecting the local regions 40, and the number of local regions 40 to be selected. For example, when the condition for selecting the local regions 40 is a foreground rate, the foreground rate may be increased a little to select the local regions 40 more strictly. Alternatively, to increase the number of local regions 40, the foreground rate may be set to a lower value, or the feature amount or the number of local regions 40 may be changed. As the setting method, the setting may be changed according to the selection of the user. For example, in the case of the foreground rate, a setting method may be selected from those determined in advance to change the foreground rate. If classifiers such as the Fern-based classifiers are used, the setting may be changed for only some of the classifiers.

In step S2203, based on the resetting performed in step S2202, the local region reselection unit 2102 reselects the local regions 40. In step S2204, the classifier training unit 305 retrains the classifier to discriminate the local regions reselected in step S2203.

As described above, according to the present exemplary embodiment, the local regions 40 to be registered into the classifier are reselected to retrain the classifier according to the classification result, so that the recognition accuracy can be further increased. In the example described according to the present exemplary embodiment, the classifier is trained using the method of training the classifier according to the first exemplary embodiment. Alternatively, the present exemplary embodiment may be applied to a classifier trained according to any one of the training methods according to the second to fourth exemplary embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-058567 filed Mar. 21, 2013, which is hereby incorporated by reference herein in its entirety.

What is claimed is:

1. An information processing apparatus for training a classifier that classifies local regions of an object, the information processing apparatus comprising:
   a computer-readable memory; and
   one or more processors that are coupled to the computer-readable memory and that are configured to cause the information processing apparatus to implement:
   a feature amount setting unit configured to set a feature amount to be used by the classifier and positions for obtaining the feature amount,
   a selection unit configured to select a local region of the object based on a rate of positions in the local region of the object to positions for obtaining the feature amount set by the feature amount setting unit, and
   a training unit configured to train the classifier using the feature amount set by the feature amount setting unit and the local region selected by the selection unit.

2. The information processing apparatus according to claim 1, further comprising a selection condition setting unit configured to set the rate.

3. The information processing apparatus according to claim 1, wherein the feature amount is a result of a binary decision based on comparing a value obtained at a predetermined position and a value obtained at another predetermined position in the local region.

4. The information processing apparatus according to claim 1, wherein the feature amount setting unit randomly sets the positions for obtaining the feature amount in the local region.

5. The information processing apparatus according to claim 1, wherein the feature amount setting unit sets one of the positions for obtaining the feature amount in the local region at a center of the local region.

6. The information processing apparatus according to claim 1, wherein the rate is a condition to be applied to a plurality of positions for obtaining the feature amount set by the feature amount setting unit.

7. The information processing apparatus according to claim 1, further comprising a condition resetting unit configured to change, according to the local region selected by the selection unit, at least one of the feature amount and the rate,
   wherein the selection unit reselects a local region of the object based on the feature amount or the selection condition change by the condition resetting unit, and
   wherein the training unit trains the classifier using the local region reselected by the selection unit.

8. The information processing apparatus according to claim 1, further comprising a determination unit configured to determine, based on the local region selected by the selection unit, whether a class of the object can be classified,
   wherein the training unit trains the classifier using local regions from which local regions in the class determined unclassifiable by the determination unit are removed.

9. The information processing apparatus according to claim 1, further comprising:
   an image input unit configured to input a captured image of the object; and
   a classification unit configured to classify, by using the classifier trained by the training unit, a class of the object in the image input by the image input unit.

10. The information processing apparatus according to claim 1, further comprising a weight determination unit configured to determine, based on the local region selected by the selection unit, a weight to be assigned when each of the local regions is classified.

11. The information processing apparatus according to claim 10, further comprising:

an image input unit configured to input a captured image of the object; and a classification unit configured to discriminate, by using the classifier trained by the training unit, a class of the object in the image input by the image input unit, according to the weight determined by the weight determination unit.

12. The information processing apparatus according to claim 1, further comprising:

an image input unit configured to input a captured image of the object;

a classification unit configured to classify, by using the classifier trained by the training unit, a class of the object in the image input by the image input unit; and a condition resetting unit configured to change, according to a classification result by the classification unit, at least one of the feature amount and the rate, wherein the selection unit reselects a local region of the object based on the feature amount or the selection condition reset by the condition resetting unit, and wherein the training unit retrains the classifier using the local region reselected by the selection unit.

13. A method for an information processing apparatus for training a classifier that classifies local regions of an object, the method comprising:

setting a feature amount to be used by the classifier and positions for obtaining the feature amount;

selecting a local region of the object based on a rate of positions in the local region of the object to positions for obtaining the set feature amount; and training, using one or more processors that are coupled to a computer-readable memory, the classifier using the set feature amount and the selected local region.

14. A non-transitory computer-readable storage medium storing a program causing a computer to perform the method according to claim 13.

* * * * *